United States Patent Office 3,257,809
Patented June 28, 1966

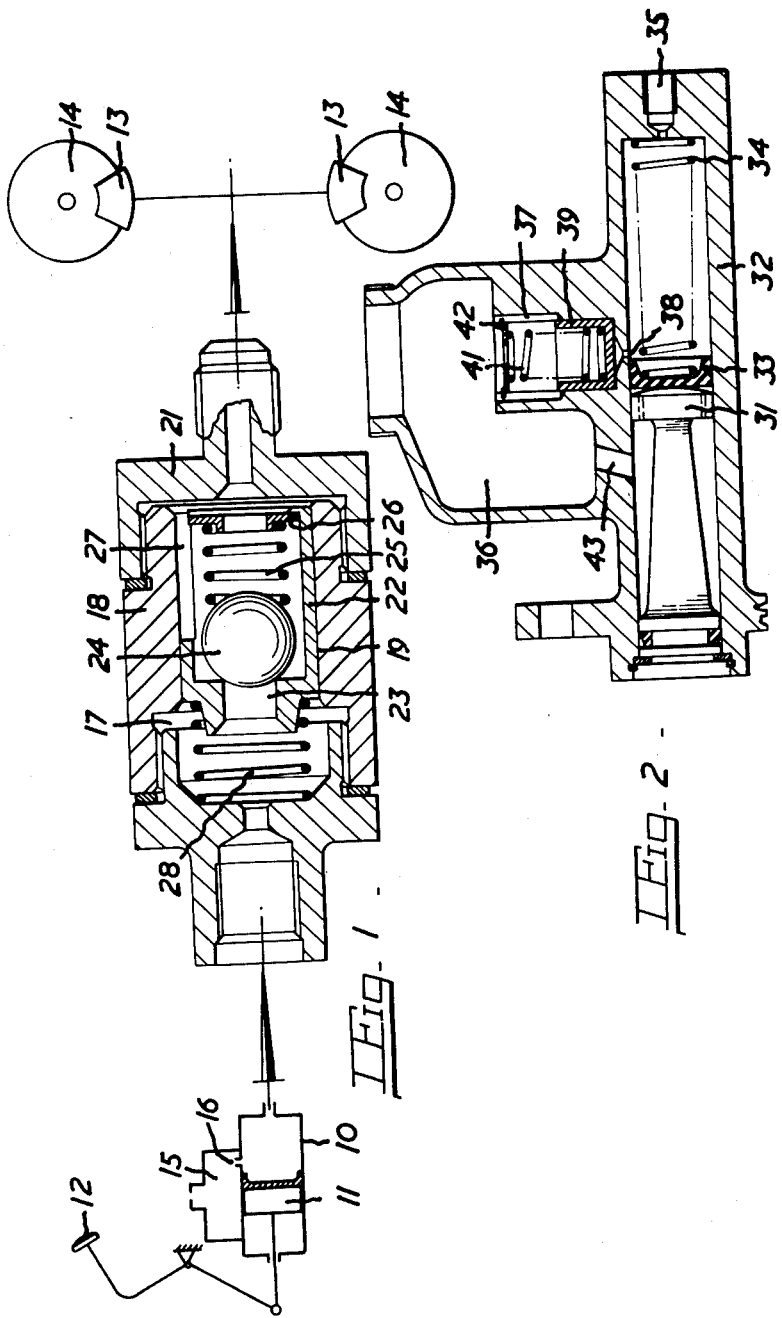

3,257,809
HYDRAULIC BRAKING SYSTEMS FOR VEHICLES
Alfred Yardley, Staffordshire, and George Broadley Spence, Warwickshire, England, assignors to Girling Limited, Birmingham, England, a British company
Filed Nov. 13, 1963, Ser. No. 323,487
Claims priority, application Great Britain, Nov. 13, 1962, 42,790/62; Feb. 5, 1963, 4,588/63
7 Claims. (Cl. 60—54.5)

This invention relates to improvements in hydraulic braking systems for vehicles of the kind in which a movable friction member is applied to a rotatable member by a piston working in an hydraulic slave cylinder to which liquid under pressure is supplied from a pedal-operated master cylinder.

When the vehicle is in motion any irregularities in the rotatable member or lack of truth in its mounting are liable to knock the piston back into the slave cylinder and force liquid to surge from the slave cylinder back to the master cylinder reservoir with the result that additional pedal travel is required to return this liquid in the next application of the brake.

This trouble is particularly liable to occur with disc brakes when the vehicle is cornering, and is accentuated in braking systems in which the friction pads are maintained in light rubbing contact with the disc in the off position of the brake.

According to our invention, in an hydraulic braking system of the kind set forth there is provided in the system between the slave cylinder or cylinders of the brakes and the piston of the master cylinder an auxiliary cylinder in which works a spring-loaded plunger adapted to yield and to allow the cylinder to accommodate liquid surging back from the slave cylinder or cylinders in the off position of the brake.

The auxiliary cylinder may be located in the pipe line between the master cylinder and the slave cylinder or cylinders, the plunger incorporating a spring-loaded valve through which liquid flows from the master cylinder to the slave cylinder or cylinders in the normal operation of the brakes and the plunger being arranged to permit the normal return of liquid from the slave cylinder or cylinders to the master cylinder on release of the brakes.

Alternatively the auxiliary cylinder may be located in a low pressure line between a fluid reservoir and a recuperation port in the wall of the master cylinder through which the pressure space of the master cylinder is put into communication with the reservoir in the off position of the brake and which is uncovered by the master cylinder piston when the piston is in its fully retracted position or is controlled by a valve which is closed or allowed to close under the action of a spring when the piston is fully retracted.

If the reservoir is remote from the master cylinder the auxiliary cylinder may be located in a pipe line connecting the reservoir to the recuperation port of the master cylinder, while if the reservoir is combined with the master cylinder the auxiliary cylinder may be incorporated in the assembly.

Two embodiments of our invention are illustrated by way of example in the accompanying drawings in which:

FIGURE 1 is a longitudinal section of a device adapted to be interposed in an hydraulic braking system between the master cylinder and the slave cylinders of the wheel brakes; and FIGURE 2 is a longitudinal section of a master cylinder and reservoir assembly incorporating an alternative device.

FIGURE 1 shows diagrammatically a master cylinder 10 in which works a piston 11 actuated by a pedal 12 to force fluid under pressure through a pipe line to slave cylinders in the calipers 13 of disc brakes of which the discs 14 are associated with the wheels of a vehicle.

When the piston 11 is in its fully retracted position, the cylinder in front of the piston is in communication with a reservoir 15 through a port 16 which is closed when the piston is advanced to apply the brake.

The device shown in section is interposed at any convenient point in the pipe line between the master cylinder and the slave cylinders.

The master cylinder 10 is connected to a chamber 17 at the rear end of a cylindrical housing 18 having an axial bore 19 of less diameter than the chamber, the bore forming an auxiliary cylinder. The forward end of the housing is closed by a flanged cap 21 which is connected to the slave cylinders of the brakes. Slidably mounted in the bore is a plunger comprising a hollow sleeve 22 having at its rear end an axial opening 23 providing on its inner side a seating for a ball valve 24 which is urged into engagement with the seating by a spring 25 located between the ball and a ring 26 fixed in the open forward end of the sleeve. A longitudinal slot 27 is formed in the sleeve extending from its forward end for about two-thirds of the length of the sleeve. A spring 28 located in the chamber 17 between the rear end of the housing and the rear end of the sleeve normally holds the sleeve against the cap 21 closing the forward end of the housing.

When the pedal is depressed to apply the brake liquid from the master cylinder flows past the ball valve 24 to the slave cylinder. When the pedal is released the ball valve closes but the volume of liquid returning from the slave cylinder is sufficient to move the sleeve 22 rearwardly far enough for the rear end of the slot 27 in the sleeve to pass out of the bore into the chamber 17 so that liquid can return to the master cylinder.

The length of the slot 27 in relation to the length of the sleeve 22 is such that the volume of liquid which the cylinder can accept before the rear end of the slot passes out of the bore into the chamber 17 is greater than the displacement of liquid from the slave cylinder or cylinders by "knock-back."

In the off position of the brake, if the piston in a slave cylinder is knocked back through a short distance by impact of a part of the disc or other rotating member with the movable friction member the sleeve 22 is moved rearwardly against its spring but the volume of liquid is not sufficient to move the sleeve far enough to bring the slot 27 into communication with the chamber, and when the knockback conditions have passed the sleeve is moved forwardly again by the spring 28 to return the displaced liquid to the slave cylinder.

The usual working tolerances between the sleeve 22 and the bore 19 in which it works will allow for the small transfer of liquid necessary to take care of volume changes due to changes of temperature.

The tolerances are maintained at a minimum value compatible with this transfer of liquid so that there is no appreciable flow of liquid past the sleeve 22 during the temporary conditions of "knock-back."

It will be appreciated that a plate valve or any other convenient type of one-way valve may be substituted for the ball valve 24.

In the alternative arrangement shown in FIGURE 2 the device is incorporated in a master cylinder and piston assembly. A piston 31 working in the master cylinder 32 is provided with a seal 33 and is normally held in the fully retracted position by a spring 34 interposed between the seal and the forward end of the cylinder which has an axial opening 35 adapted to be connected to the slave cylinders of the brakes.

The master cylinder is integral with a reservoir 36, and an auxiliary cylinder 37 open at its upper end to the reservoir communicates at its lower end with the pressure space in the cylinder by way of a relief port 38 in the cylinder wall which is uncovered by the piston when the piston is in its fully retracted position. A plunger 39 working in the auxiliary cylinder is urged downwardly by a spring 41 interposed between the plunger and a spider 42 located in the counter-bored upper end of the cylinder 37.

When the brake is in the off position, if the piston of a slave cylinder is knocked back there is a surge of liquid back toward the pressure space of the master cylinder which forces liquid through the relief port 38 and lifts the plunger 39 against its spring-loading. When the force which has knocked the slave piston back ceases to act the plunger 39 forces liquid back through the relief port 38 into the pressure space of the master cylinder and assists in returning the slave piston and maintaining the friction pads of the brake in light rubbing contact with the disc.

The plunger 39 is conveniently made a sufficiently loose fit in its cylinder to allow liquid to leak past it from the pressure space of the master cylinder when there is a prolonged rise in the pressure of the liquid due to an increase in temperature or for any other reason.

Normal replenishment of the system from the reservoir is effected by way of a port 43 leading from the reservoir 36 into the master cylinder behind the working piston 31 which has a stem of less diameter than the cylinder, liquid flowing from the space behind the piston past the piston seal into the pressure space in the known manner if there is a reduction of pressure there from any cause.

The arrangement described above has a number of practical advantages amongst which are the spring-loaded plunger is only operative on "knock-back" and does not affect the normal operation of the brakes, and that during normal braking it reduces the displacement of liquid back to the reservoir and so reduces pedal travel.

In a braking system in which the reservoir is separate from the master cylinder a unit as shown in FIGURE 1 may be located in a pipe line between the reservoir and the recuperation port in the master cylinder instead of being located in the high pressure line between the master cylinder and the slave cylinders of the brakes.

Our invention can be applied to single or tandem master cylinders.

What is claimed is:

1. An hydraulic system for operating vehicle disc brakes comprising a master cylinder, a piston axially movable in the cylinder to displace liquid from a pressure space in the cylinder in front of the piston, a fluid reservoir with which the pressure space communicates through a port in the cylinder which is open when the piston is in its fully retracted position and closed when the piston is advanced to apply the brakes, at least one brake actuating slave cylinder to which liquid under pressure is supplied from the pressure space of the master cylinder, an auxiliary cylinder in the system which is in communication with the slave cylinder at least when the piston of the master cylinder is fully retracted, a plunger slideably received in said auxiliary cylinder, stop means limiting movement of the plunger in a direction forcing fluid out of the auxiliary cylinder towards the slave cylinder, spring means resiliently resisting movement of the plunger away from said stop means whereby said plunger normally does not exert any pressure on the fluid in the system but can yield to accommodate within the auxiliary cylinder fluid forced back from the slave cylinder in the off position of the brake, and a restricted leakage path around said plunger for relieving to said reservoir excess fluid trapped between said auxiliary and slave cylinders whenever said auxiliary cylinder is in communication with said slave cylinder.

2. An hydraulic system for operating vehicle disc brakes comprising a master cylinder, a piston axially movable in the cylinder to displace liquid from a pressure space in the cylinder in front of the piston, a fluid reservoir with which the pressure space communicates through a port in the cylinder which is open when the piston is in its fully retracted position and closed when the piston is advanced to apply the brakes, at least one brake actuating slave cylinder, a pipe-line connecting said slave cylinder to the pressure space of the master cylinder, an auxiliary cylinder in said pipe-line connected at its first end to the pressure space of the master cylinder and connected at its second end to the slave cylinder, a plunger working in said auxiliary cylinder, a passage extending through said plunger, a one-way valve controlling the flow of liquid through said passage and permitting flow only in a direction towards the slave cylinder, spring means normally holding the plunger in engagement with the said end of the auxiliary cylinder, whereby the plunger does not normally apply any pressure to the fluid in the system, means permitting the flow of liquid past the plunger in a direction towards the master cylinder on movement of the plunger through a predetermined distance towards the first end of the auxiliary cylinder greater than that required to accommodate liquid forced back from the slave cylinder in the off position of the brake, and a restricted leakage path around said plunger at all times communicating said slave cylinder with said master cylinder for relieving excess fluid between said slave and auxiliary cylinders and insure return of said plunger to its normal position in the off position of said brake.

3. An hydraulic system as in claim 2 wherein said means comprises a longitudinal slot in the outer surface of the plunger which on movement of the plunger through a predetermined distance allows liquid returning from the slave cylinder on release of the brake to flow past the plunger from the second end of the auxiliary cylinder to the first end and so to the pressure space of the master cylinder.

4. An hydraulic system for operating vehicle disc brakes comprising a master cylinder, a piston axially movable in the cylinder to displace liquid from a pressure space in the cylinder in front of the piston, a fluid reservoir with which the pressure space communicates through a port in the cylinder which is open when the piston is in its fully retracted position and closed when the piston is advanced to apply the brakes, at least one brake actuating slave cylinder to which liquid under pressure is supplied from the pressure space of the master cylinder, an auxiliary cylinder interposed between said port and the reservoir, a plunger working in said auxiliary cylinder, and spring means normally holding said plunger against the end of the cylinder into which said port leads whereby said plunger does not normally exert any pressure on the fluid in the system but can yield to allow the auxiliary cylinder to accommodate fluid surges from the slave cylinder in the off position of the brake without permitting the fluid to return to the reservoir and a leakage path around said plunger for permitting the slow return to said reservoir of excess fluid between said auxiliary and slave cylinders when the brake is in its off position.

5. An hydraulic system as in claim 4 wherein the master cylinder and reservoir form a unitary assembly and the auxiliary cylinder is incorporated in the assembly.

6. An hydraulic system for operating vehicle disc brakes comprising a master cylinder, a piston axially movable in the cylinder to displace liquid from a pressure space in the cylinder in front of the piston, a fluid reservoir with which the pressure space communicates through a port in the cylinder which is open when the piston is in its fully retracted position and closed when the piston is advanced to apply the brakes, at least one brake actuating slave cylinder to which liquid under pressure is supplied from the pressure space of the master cylinder, an auxiliary cylinder interposed between said port and the reservoir, a plunger working in said auxiliary cylinder and being of a size to provide between it and said auxiliary cylinder limited communication between the slave cylinder and the reservoir when said port is open, spring means normally holding said plunger against the end of the auxiliary cylinder into which said port leads whereby said plunger does not normally exert any pressure on the fluid in the system but can yield to allow the auxiliary cylinder to accommodate sudden surges of fluid forced back from the slave cylinder in the off position of the brake without returning to the reservoir.

7. A master cylinder and reservoir assembly for an hydraulic disc braking system comprising a master cylinder, a piston axially movable in the cylinder to displace liquid from a pressure space in the cylinder in front of the piston, a fluid reservoir integral with the master cylinder, a port in the cylinder wall within the pressure space which is open when the piston is in its fully retracted position and closed when the piston is advanced to apply pressure to the liquid in the pressure space, a cylindrical bore disposed between said port and the reservoir, a plunger working in said cylindrical bore and having a clearance therewith to provide limited communication between the reservoir and the pressure space when the port is open, and spring means normally holding the plunger against the end of the cylinder into which said port leads.

References Cited by the Examiner
UNITED STATES PATENTS

| | | | |
|---|---|---|---|
| 2,077,748 | 4/1937 | Farina | 60—54.6 |
| 2,207,173 | 7/1940 | Goepfrich | 60—54.6 X |
| 2,217,461 | 10/1940 | Weihe | 60—54.6 |
| 2,501,108 | 3/1950 | Wahlberg | 60—54.6 |

FOREIGN PATENTS 374,150  6/1932  Great Britain.

EDGAR W. GEOGHEGAN, *Primary Examiner.*

ROBERT R. BUNEVICH, *Examiner.*